Jan. 1, 1963 G. C. SCHUTZ 3,071,765
RADAR MAP GUIDANCE SYSTEM
Filed Aug. 11, 1950 5 Sheets-Sheet 1

INVENTOR.
GERALD C. SCHUTZ
BY Wade Koontz AND
Orlando R. Mosley
ATTORNEYS

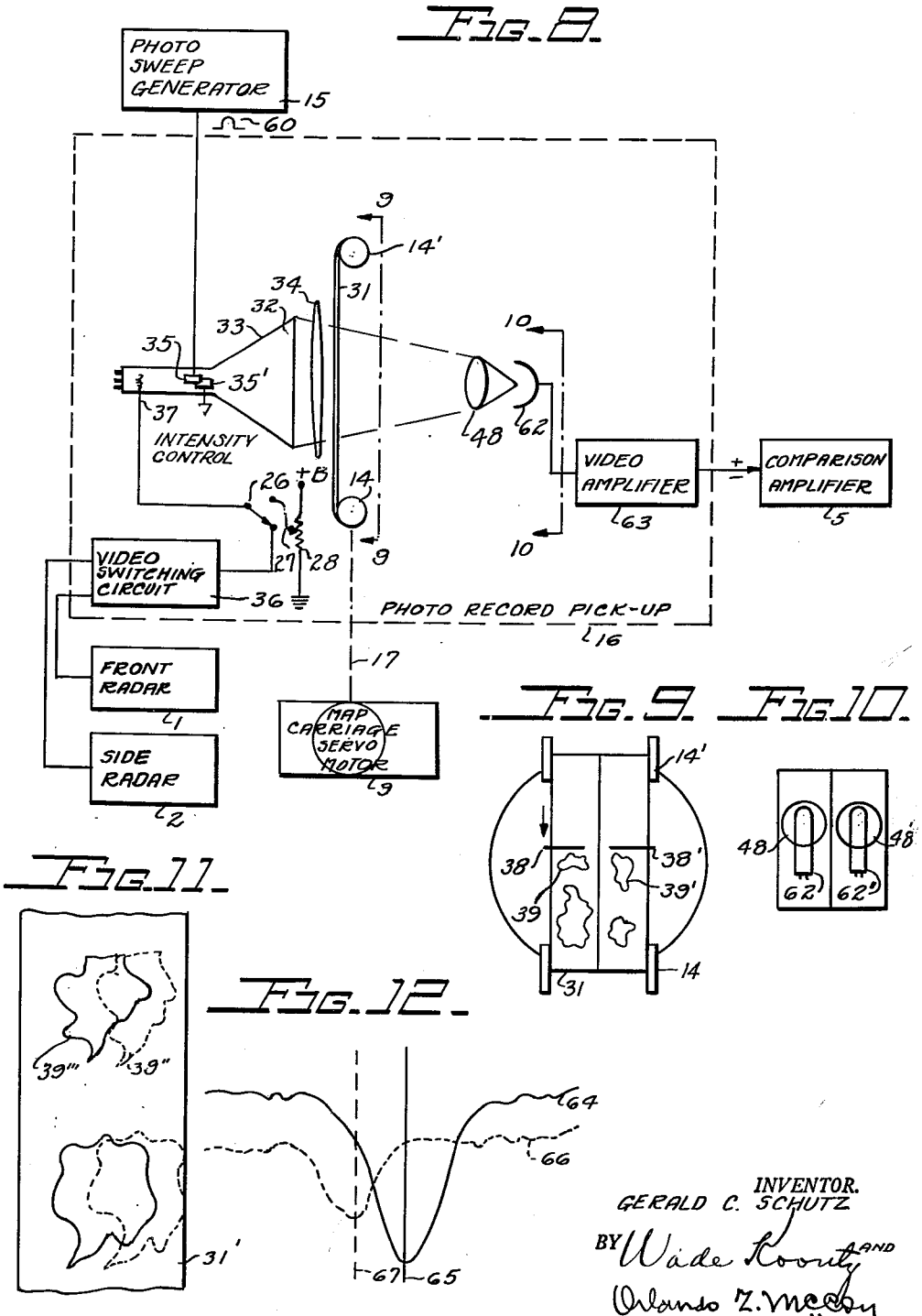

INVENTOR.
GERALD C. SCHUTZ

Jan. 1, 1963  G. C. SCHUTZ  3,071,765
RADAR MAP GUIDANCE SYSTEM
Filed Aug. 11, 1950  5 Sheets-Sheet 4
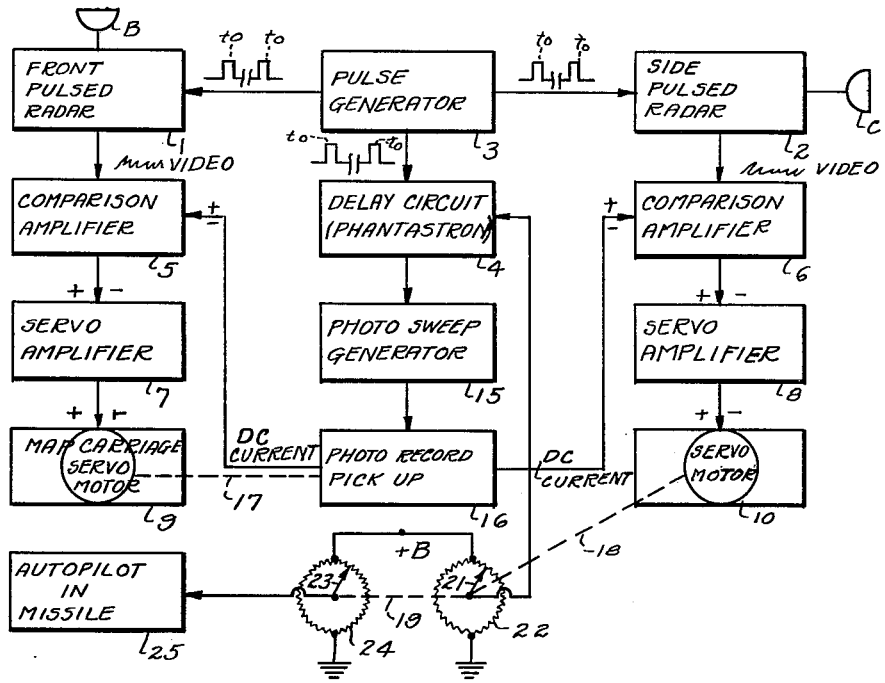
_Fig. 4._
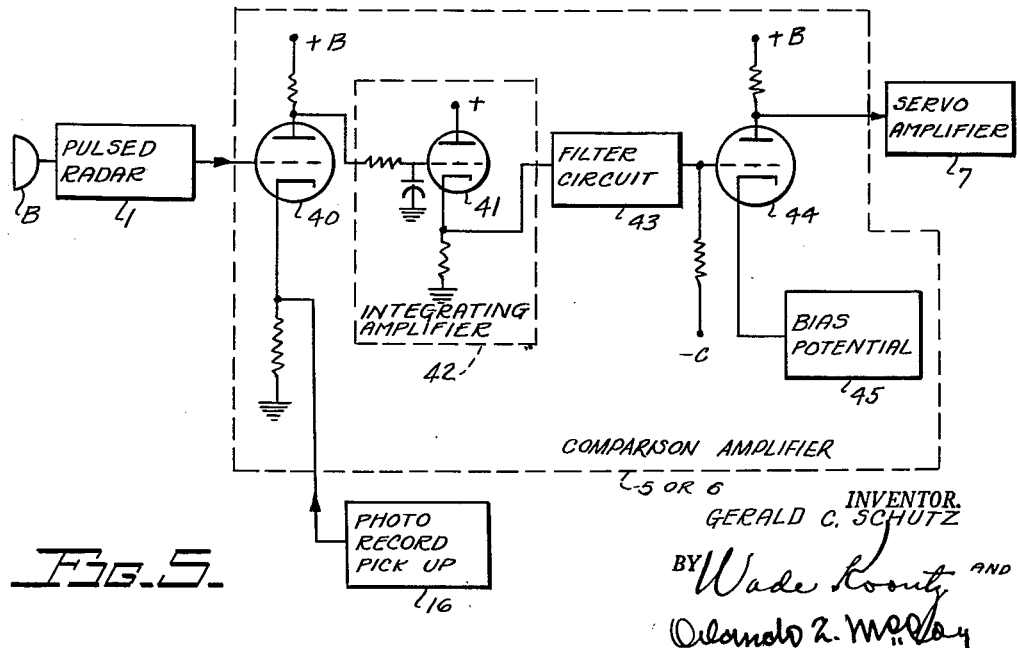
_Fig. 5._
INVENTOR.
GERALD C. SCHUTZ
BY Wade Koontz AND
Orlando R. McVay
ATTORNEYS

United States Patent Office 3,071,765
Patented Jan. 1, 1963

3,071,765
RADAR MAP GUIDANCE SYSTEM
Gerald C. Schutz, Beloit, Wis., assignor to the United States of America as represented by the Secretary of the Air Force
Filed Aug. 11, 1950, Ser. No. 178,947
3 Claims. (Cl. 343—7)
(Granted under Title 35, U.S. Code (1952), sec. 266)

The invention described herein may be manufactured and used by or for the Government for governmental purposes without payment to me of any royalty thereon.

This invention pertains to a radar map guiding system and more particularly to a radar method using novel means for causing an unattended aircraft to duplicate a previously made flight path of a reconnaissance aircraft.

In the past, automatic control over the flight course of a pilotless aircraft was commonly accomplished by radio signals transmitted from a mother ship that was maintained in continuous attendance upon the pilotless aircraft throughout the flight. Signals of a plurality of frequencies were transmitted from the mother ship and intercepted by a receiver in the pilotless aircraft. The receiver in the pilotless aircraft applied the received signals to a plurality of channels that selectively sorted the signals according to frequencies or other criteria. Each channel applied its output to a relay that energized a control device that operated a control on the pilotless aircraft. In this manner the controls of the pilotless aircraft such as elevators, rudders, ailerons, arm, fire and the like, each had two separate frequencies and channels allotted thereto for advanced and retarded positions, in some cases at full throttle and in others at graduated throttle.

An object of the present invention is to provide a system whereby a reconnaissance airplane is caused to leave a launching platform and separately from a forwardly directed antenna assembly and from a laterally directed radar assembly to make a time track and an azimuth track on preferably a single film that is continuously uninterrupted from the time the reconnaissance aircraft leaves its launching platform until it arrives at a proposed target. The system contemplates an equipment for making the flight record map in the reconnaissance plane and interpreting that record in a pilotless aircraft controlled in azimuth and in time by the two tracks on the film made in the pilotless aircraft for the purpose of causing the pilotless aircraft to duplicate the flight of the reconnaissance aircraft.

For the above and other objects in view that will appear hereinafter an illustrative embodiment of the present invention is shown in the accompanying drawings wherein:

FIG. 4 is an electrical circuit block diagram of the circuit part of the present invention, as used in the pilotless aircraft;

FIG. 5 is an electrical circuit block and schematic diagram of an illustrative comparison amplifier for insertion in the circuit shown in FIG. 4;

FIG. 6 is an electrical circuit schematic diagram of an illustrative delay circuit for insertion in the circuit shown in FIG. 4;

FIG. 9 is an elevational view of two video signal flight tracks on a film made during the reconnaissance flight and viewed from the line 9—9 in FIG. 8;

FIG. 10 is an elevational view of two photoelectric tubes viewed from the line 10—10 of FIG. 8;

FIG. 11 is an enlarged view of a film bearing a reconnaisance track not in registration with a missile track;

FIG. 12 is a photoelectric tube voltage curve;

Figure 16:
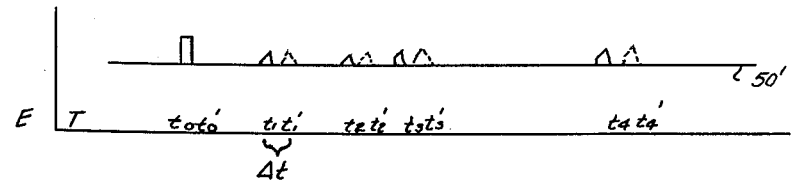
Figure 17:
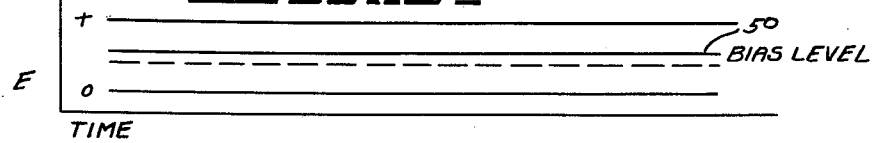

FIG. 16 is a limited voltage-time graph of the graph in FIG. 12 in full lines with signal intercepted by the pilotless aircraft shown in dotted lines as being displaced in point of time from the signal made by the reconnaissance aircraft, an amount indicative of "off course" position of the pilotless aircraft; and FIG. 17 is a voltage-time graph of the bias level on either side of which an off course error signal is passed to the controls of the pilotless aircraft.

Figure 1:
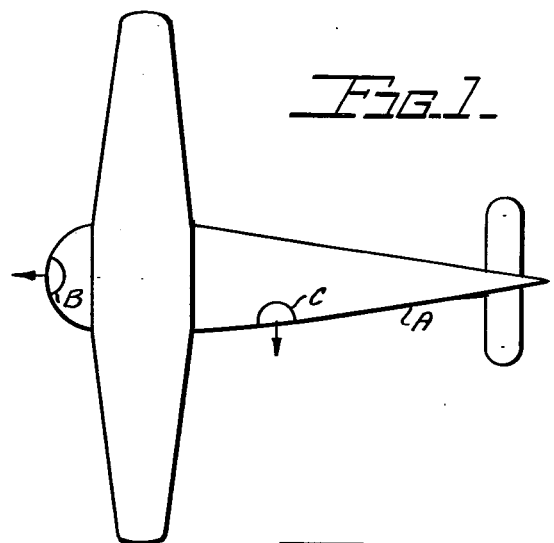
FIG. 1 is a plan view of an aircraft carrying two radar antenna assemblies, one directed straight ahead and the other directed off to the side.
Figure 2:
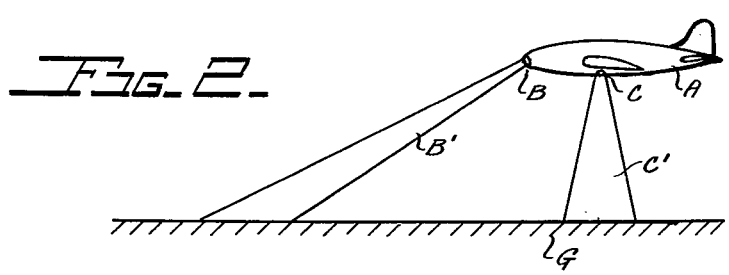
FIG. 2 is an elevational diagram of the equipment shown in FIG. 1.

An airplane A, shown in FIGS. 1 and 2 of the accompanying drawings, represents either the reconnaissance aircraft or the pilotless aircraft contemplated hereby both of which carry comparable equipment. The aircraft A carries two radar antenna assemblies B and C. One radar assembly B is directed straight ahead. The other radar assembly C has its axis directed at a fixed angle of 90° away from or to the side of the axis of the radar assembly B. As indicated in FIG. 2, the radar assemblies B and C radiate lobes B′ and C′, respectively, that are directed toward the ground at a preestablished angle.

During a reconnaissance flight at a predetermined altitude and speed, each of the two antenna assemblies B and C independently picks up a linear radar strip signal record or a track on preferably a single film that is characteristic of the terrain flown over. Each of the tracks are precise as to azimuth and time. The two tracks on the films so exposed provide a photographic record of the terrain flown over by the reconnaissance aircraft as interpreted by the radar systems carried by the aircraft. The time of flight or range is indicated along the length of the film. The relative brightness of the response indicates the relative total response or echo return. The film so made by the reconnaissance aircraft, upon being inserted in comparable equipment in a pilotless aircraft, provides a flight course indicating map for directing the flight of the unattended aircraft over a course that duplicates the previous flight by the reconnaissance aircraft.

Figure 3:
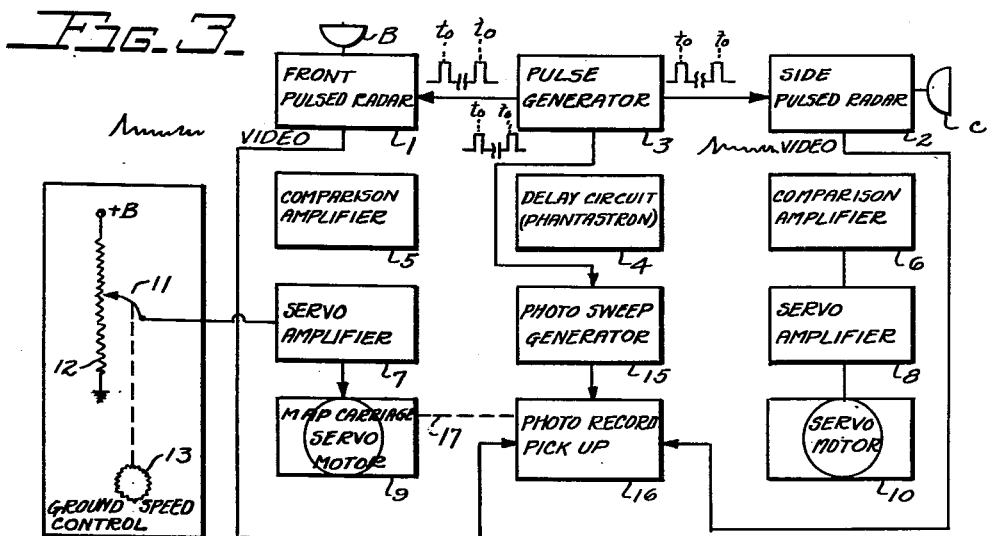
FIG. 3 is an electrical circuit block diagram part of the present invention, as used in the reconnaissance plane in preparing a film bearing two tracks for use in the unattended aircraft or missile.

The equipment installed in both the reconnaissance aircraft and in the unattended aircraft is shown as an electrical circuit block diagram in FIGS. 3 and 4 of the accompanying drawings. The radar antenna assemblies B and C are common to FIGS. 1, 2, 3 and 4. The circuit shown in FIG. 3 comprises a pulse radar 1 with its antenna assembly B directed straight ahead and toward the earth, with respect to the axis of the aircraft, and a pulsed radar 2 with its antenna assembly C mounted at a right angle with respect to the axis of the aircraft and also mounted to scan the ground beneath.

The circuitry shown in FIG. 3 is connected for its use in the reconnaissance aircraft in the making of a flight course indicating map for subsequent use in a pilotless aircraft. The reconnaissance aircraft carries a forwardly directed radar, antenna assembly B and a laterally directed radar antenna assembly C associated with radars 1 and 2, respectively. Radars 1 and 2 are supplied pulses of constant frequency from a pulse generator 3, which also supplies pulses of the same frequency or rate to a photosweep generator 15. Output from the photosweep generator 15 is passed to a photo record pick-up 16.

Figure 8:
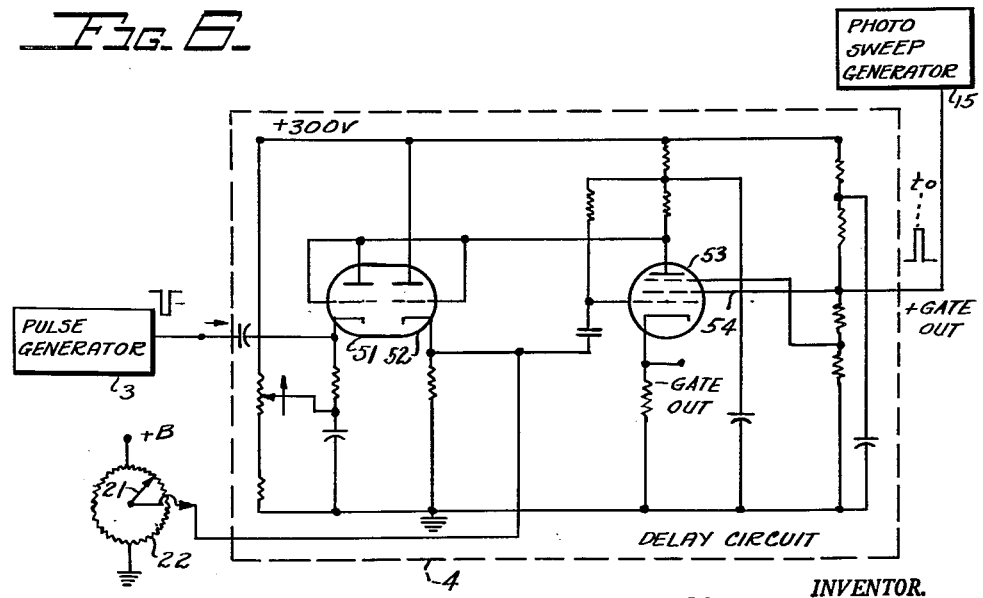
FIG. 8 is a fragmentary diagrammatic presentation of an illustrative photorecord pick-up for insertion in the circuit shown in FIG. 4.

The photo record pick-up 16 contains a film spool map carriage, such as that in FIG. 8, driven by a map carriage servomotor 9. The map carriage servomotor 9 is operated at a speed that is dependent upon a representative voltage tapped by a contact 11 from a potentiometer winding 12, to the opposite ends of which a plus-B voltage and ground are applied. The setting of the tap 11 on the potentiometer winding 12 is made by the manual operation of a ground speed control knob 13.

The ground speed control knob 13 is adjusted such that the potential from the potentiometer winding 12 at the tap 11, is in proportion to the ground speed of the reconnaissance aircraft. The potential from the potentiometer 12 is applied through the servoamplifier 7 to actuate a map carriage servomotor 9. The map carriage servomotor 9 drives the map carriage in the photo record pick-up 16 at a speed that is proportional to the ground speed of the aircraft. The map carriage represented in FIG. 8 of the drawing is a pair of film spools 14 and 14' carrying a film 31.

Preparatory to a reconnaissance flight, raw film is mounted on the film spools 14 and 14'. The map carriage servomotor 9 through a mechanical coupling indicated by the dash line 17 causes the film 31 to pass before the screen 32 of a flying spot cathode ray tube 33 with a lens system 34 interposed therebetween. Sweep voltage from the photosweep generator 15, triggered by pulses from the pulse generator 3, fixes the starting time of each sweep of the cathode ray in the cathode ray tube 33 with the vertically disposed, horizontal sweep timing plates 35 and 35' of which the photosweep generator 15 is connected.

During the reconnaissance flight as the map carriage servomotor 9 causes the raw film 31 to pass before the face 32 of the tube 33, the front radar 1 and the side radar 2, through a video switching circuit 36 and downwardly-closed switch 26, signals alternately upon the intensity grid 37 of the cathode ray tube 33, such that the presentation one one side of the tube screen 32 is from the radar 1 and the presentation on the other side of the tube screen 32 is from the radar 2.

The flying spot of the cathode ray tube 33 causes lines 38 and 38' to appear across the tube 32. The lines 38 and 38' are intensity modulated in accordance with the strength of the video signals from the radars 1 and 2 and leave upon the film 31 latent images 39 and 39' as the film 31 passes from one to the other of the spools 14 and 14'.

Upon the return of the reconnaissance aircraft from its flight the film 31 is developed thereby fixing thereon the images 39 and 39' from the front and side radars 1 and 2 respectively, as two flight tracks upon a single film. The images 39 and 39' are treated of more fully in the description of FIGS. 11 to 14, inclusive, of the drawings.

The equipment in the unattended aircraft is shown in FIG. 4 of the accompanying drawings wherein reference numerals of comparable components conform with those in FIG. 3. Preparatory to the making of an unattended flight the developed film 31 taken during the reconnaissance flight is threaded on the spools 14 and 14' in the photo record pick-up 16 and the equipment is adjusted for unattended operation. The unattended aircraft is then launched to conform in the most strict detail possible with the launching of the reconnaissance aircraft. The equipment in FIG. 4 of the drawings then directs in azimuth the flight path of the unattended aircraft flying at an altitude that is maintained constant within the limits of a radio altimeter and at a speed that is maintained constant within the limits of an autopilot. The equipment on the left hand side of the circuit in FIG. 4 of the drawings compensates in rate of operation of the film 31 for minor alterations in speed of flight within the limits of the autopilot. The equipment on the right hand side of the circuit 4 compensates in azimuth for minor alterations in direction also within the limits of the autopilot.

In the circuit shown in FIG. 4, the radars 1 and 2 are supplied a constant frequency from the pulse generator 3. The pulse generator 3 also supplies its constant frequency output to a delay circuit 4, such as a phantastron or the like.

The radars 1 and 2 pass their respective outputs to comparison amplifiers 5 and 6. A velocity error signal from the comparison amplifier 5 passes through the servo amplifier 7 to the map carrier servomotor 9. An azimuth error signal from the comparison amplifier 6 is passed through the servo amplifier 8 to an azimuth servomotor 10. The delay circuit or phantastron 4 inserts a predetermined delay to the pulsed output from the pulse generator 3. The pulses so delayed are passed through the photo sweep generator 15 to the photo record pick-up 16. The photo record pick-up 16 has a video velocity output applied to the comparison amplifier 5 and a video azimuth output applied to the comparison amplifier 6.

The map carrier servomotor 9, through the mechanical coupling 17, controls the rate at which the film 31 on the spools 14 and 14' is moved in the photo record pick-up 16. During unattended operation in FIGURE 8 switch 26 is applied to potentiometer tap 27 contact with no connection to the video. Preparatory to unattended operation the potentiometer tap 27 is adjusted upon the winding 28 to provide adequate light intensity to the cathode ray tube flying spot to penetrate the film 31 and register signal upon photo sensitive tubes 62 and 62' in the photo record pick-up 16.

The azimuth signal servomotor 10 has a mechanical coupling 18 with a potentiometer arm 21 upon a potentiometer circular winding 22. The potentiometer arm 21 is mechanically ganged as indicated by a dash line 19, with another potentiometer arm 23 that is thereby caused to be moved correspondingly in direction and amount along its circular potentiometer winding 24. Both potentiometer windings 22 and 24 have B-plus voltage and ground applied at opposite ends of diameters thereof.

The azimuth determining servomotor 10, through the mechanical couplings 18 and 19 adjust simultaneously the settings of both potentiometer arms 21 and 23. An alteration in the setting of the potentiometer arm 21 on its winding 22 alters the potential feed back to the delay circuit 4 where it alters, through the photo sweep generator 15, the electrical input into the photo electric pick-up 16. An alteration in the setting of the potentiometer arm 23 on its winding 24 provides an error voltage to an auto pilot 25 or the like, to maintain the pilotless aircraft on course in azimuth. Such an error voltage varies in magnitude with the degree that the unattended aircraft may have departed from a signal sequence from the two tracks on the film 31.

The system operating in very short time intervals continuously compares in the photo record pick-up 16, input signals from the antenna assemblies B and C on the unattended aircraft with the reconnaissance flight record on the film 31. The radar equipment is operating in the time range of microseconds and consequently any absence of synchronization is sensed and corrected as an aircraft rudder control promptly so as not to permit the unattended aircraft to depart appreciably from its intended flight course.

It will be noted that the circuit in FIG. 4 has two servo loops; a circular timing loop comprising the comparison amplifier 5, the map carriage servomotor 9, the photo record pick-up 16 and back to the comparison amplifier 5; and a figure eight azimuth loop comprising the comparison amplifier 6, to the servomotor 10, the potentiometer 22, the delay circuit 4, to the photo record pick-up 16 and back to the comparison amplifier 6. The timing loop adjusts the speed of the film carriage. The azimuth loop maintains the unattended aircraft on course in azimuth.

Representative equipment for installation in the circuit shown in FIG. 4 is illustrated in FIGS. 5 to 10, inclusive, of the drawings. The comparison amplifier shown in FIG. 5 is representative of the comparison amplifiers 5 and 6 and comprises a tube 40 to the grid of which video signals from the radar 1 is applied and to the cathode of which video signal from the photo record pick-up 16 is applied. Output from the tube 40 is fed to the grid of an integrating amplifier tube 41 in an integrating amplifier 42, where the signals from the radar 1 and from a photo record pick-up 16 are integrated. Output from the integrating amplifier circuit 42 is taken from the cathode of tube 41 and is fed into a filter circuit 43. The filter circuit 43 performs a smoothing function on the signal ending up in a direct current voltage on the grid of the tube 44. The tube 44 performs a biasing function to the signal permitting its output to the servo amplifier 7 to be either positive or negative.

The output from the servo amplifier 7 is applied to the map carriage servomotor 9 where it accelerates or retards the rotation rate of the motor rotor and consequently the rate of travel of the film 31 before the screen 32 of the cathode ray tube 33. Whether the rate of revolutions of the servomotor 9 is accelerated or retarded depends upon which side of the bias level line 50, in FIG. 17 of the drawings, the output from the servo amplifier 7 falls. If the output from the servo amplifier 7 is positive it falls above the line 50 and the rotor in the motor 9 rotates in an opposite direction than if the output from the servomotor amplifier 7 is negative and falls below the line 50.

The delay circuit 4 shown in FIG. 6 of the drawings, receives pulses of the same frequency fed to the radars 1 and 2 from a pulse generator 3, as negative trigger pulses applied upon the cathode of the diode tube 51 of the illustrative phantastron type of delay circuit 4 shown. Modifications in potential with change in position of the potentiometer arm 21 on its winding 22, by operation of the azimuth servomotor 10 is applied to the cathode follower tube 52 and, to the grid of the phantastron tube 53 of the delay circuit 4. Output from the delay circuit 4 is taken from the number two grid 54 of the phantastron tube 53 and is applied to the photo sweep generator 15.

Figure 7:
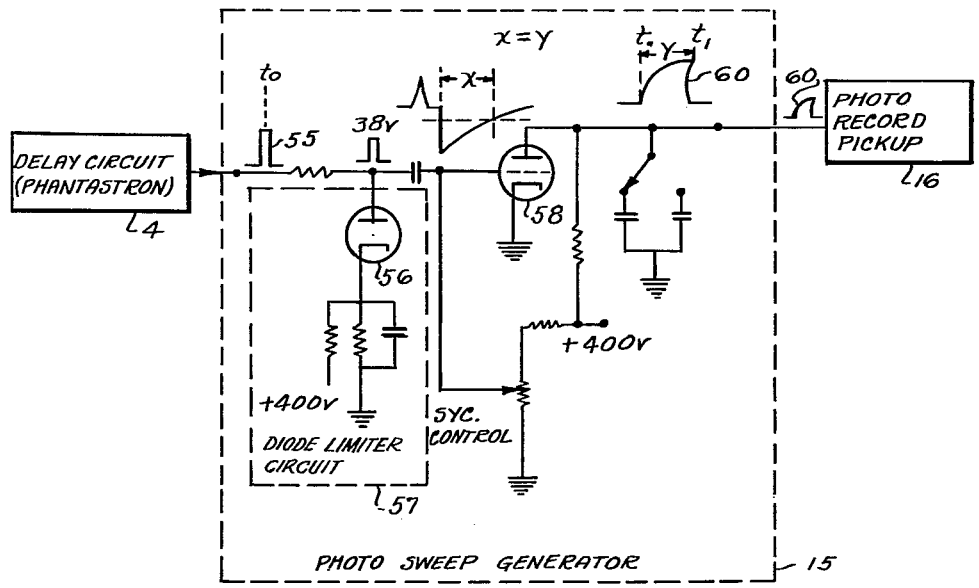
FIG. 7 is an electrical circuit schematic diagram of an illustrative photosweep generator for insertion in the circuit shown in FIG. 4.

The input into the photo sweep generator 15, carrying any modifying potential from the potentiometer 22, is represented in FIG. 7 of the drawings by the pulse 55. The photosweep generator 15 receives as input trigger pulses 55 on the plate of a limiter tube 56 in a diode limiter circuit 57 and on the grid of the sweep generator tube 58. Output from the photosweep generator 15 is taken as the sweep voltage pulses 60 and is applied as sweep timing pulses to the plates 35 in the cathode ray tube 33.

The photo record pick-up circuit shown in FIG. 8 of the drawings comprises the cathode ray tube 33 of the flying spot type with sweep timing plates 35 and 35' to which pulses from the photo sweep generator 15 are applied and a grid 37 to which signals from the radars 1 and 2 are applied through the video switching circuit 36. The switch 26 engages its lower contact with the video switching circuit 36 during the reconnaissance flight. The switch 26 engages its upper contact with the potentiometer tap 27 during automatic flight of the armed missile as an intensity control over the circular path of the flying spot on the cathode ray tube screen 32, applying light on the way down to one side of the film 31 and on the way up to the other side of the film 31. The photo record pick-up 16 comprises further a map carriage including film spools 14 and 14' driven by the map carriage servomotor 9 by the mechanical coupling 17. The film 31 is caused to pass between the spools 14 and 14' between lens systems 34 and 48. The map carriage is driven by the map carriage servomotor 9 through the mechanical connection 17 at a rate that is proportional to the ground speed of the aircraft, modified during the unattended flight from the photo record pick-up 16 as indicated in FIG. 5 of the drawings.

The lens system 48, 48' is duplicated to provide one image from each side of the cathode ray tube screen 32 focused separately upon photosensitive tubes 62 and 62'. Separate outputs from the photo sensitive tubes 62 and 62' are separately amplified in a pair of video amplifiers of which video amplifier 63 is representative. Outputs from the video amplifiers 63 are passed as separate input pulses to the cathodes of duplicate tubes 40 in the comparison amplifiers 5 and 6, one impulse for use in maintaining the speed of rotation of the map carriage servomotor 9 and other impulse used in maintaining the azimuth servomotor 10 synchronized in maintaining the unattended aircraft on a flight path duplicating that made by the reconnaissance flight.

The photo record pick-up 16 represented in FIGS. 8, 9 and 10 is a type of available marketed comparator wherein the equipment is reciprocated or moved from side to side until the signal error between the incoming radar signal 39" and the radar image 39"' on the film 31', as represented in FIG. 11, become smaller and smaller and the missile is back upon its proper track again.

The photo sensitive tubes 62 and 62' in FIGS. 8 and 10 have voltage curves that are characteristic of their outputs, such as the full line curve 64 in FIG. 12 at the characteristic voltage minimum line 65 for one of the tubes. The curve 64 has a characteristic dip at a true match at the intersection of curve 64 and line 65 wherein the voltage emitted from one of the photo sensitive tubes reaches a characteristic voltage minimum where the two transparencies made up of the full line image 39"' on the film 31' and the radar return dash line image 39" exactly superimpose over each other and hence cause a minimum amount of light to strike the corresponding photo sensitive tube 62 or 62'. Less than this optimum amount of opacity results in a false match represented by the dash curve 66 at its intersection with dash line 67, in which situation the equipment, in known manner, is moved in a reciprocating manner until a true match is obtained. In this way the missile is maintained on course at all times in the presence of head winds, cross winds or other disturbances.

In FIGS. 13 to 17, inclusive, of the drawings, the pulse performance B' of the antenna assembly B may be regarded as being representative of the pulse phenomena for the antenna assembly C also.

During a reconnaissance flight a pulse emitted at time $t_0$ may initiate a plurality of echo responses $t_1$, $t_2$, $t_3$ etc., that arise above the noise level of the response of the radar 1 and that in the photo record pickup 16 are applied as a succession of latent images 39 along one track of the film 31. The two tracks of latent images from the antenna assemblies B and C along the film 31 become real and permanent images upon the development of the film.

Figure 13:
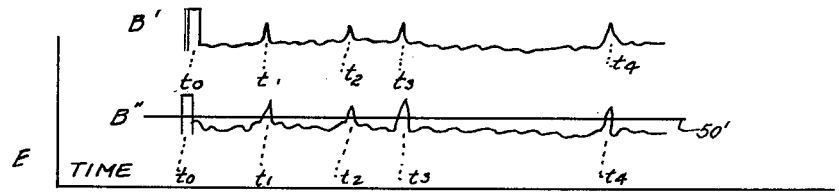
FIG. 13 is a voltage-time graph of one photoelectric tube output in FIG. 8.
Figure 14:
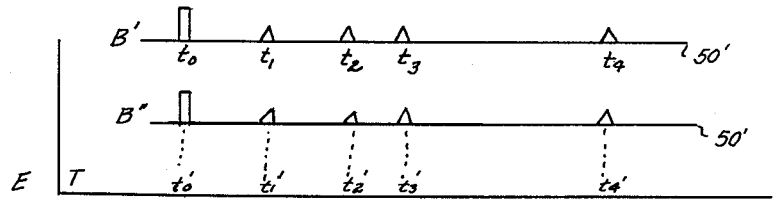
FIG. 14 is a voltage-time graph limited to remove noise from one trace on the film shown in FIG. 9.

During an unattended flight, the bias potentials 45 in the comparison amplifiers 5 and 6 are adjusted to a bias level indicated by the line 50 in FIGURE 17 and by the line 50' in FIG. 13 as applied to the antenna assembly B track of the film 31. The bias 50' limits the signal to above the noise level to provide the series of pulses represented in FIG. 14. The pulses along the line $B^1$ represent an actually transmitted corresponding pulse $t_0$ and its received echoes $t_1$, $t_2$, $t_3$ etc., during the unattended flight. The pulses along the line B" represent the developed images 39 on the track of the film 31 from the antenna assembly B.

Figure 15:
FIG. 15 is a limited voltage-time graph of intercepted signals integrated with the trace shown in FIG. 12 indicating "on course" flight of the pilotless aircraft.

During the unattended flight and with the unattended aircraft properly on course, as represented in FIG. 15, the then transmitted pulse $t_0$ is integrated with the corresponding $t_0$ pulse on the antenna assembly B track of the film 31. This signal integration occurs at the integrating amplifier 42 in the comparison amplifier 5 such that the pulses $t_0+t_0'$, $t_1+t_1'$, $t_2+t_2'$, etc., are of added amplitude and at the same time occurrences, as indicated in FIG. 15. Under this circumstance the unattended aircraft is on course and no signal is passed to either of the selsynmotors 9 and 10.

During the unattended flight with the aircraft off course, and with reference to FIG. 16 of the drawings, with the signal, pulses $t_0$, $t_1$, $t_2$, etc., read from the film shown in full lines and the signal pulses $t_0'$, $t_1'$, $t_2'$, etc., transmitted from and the returned echo pulses received back by the aircraft antenna assembly B shown in dotted lines, an echo pulse return time delay of $\Delta t$ is indicated. When this delay of $\Delta t$ in the returned echo pulse is applied by the radar 1 to the grid of tube 40 in the comparison amplifier 5 it follows the application to the cathode of the tube 40 of a potential from the photo record pick-up 16 and produces an output from the servo amplifier 7 that actuates the map carriage servomotor 9 to control in sense and magnitude the operation of the map carriage and thereby cause the map film 31 to return to synchronization with the returned echo pulses. At the same time the potentiometer 24 provides an error voltage to the autopilot 25 in the proper direction to return the aircraft to the proper course.

It is to be understood that the equipment that is shown and described herein has been submitted for the purposes of illustrating and describing an operative embodiment of the present invention and that similarly operating equipment and modifications thereof may be substituted therefor without departing from the scope of the present invention.

What I claim is:

1. Means for navigating an unattended aircraft, comprising a front radar, a side radar, a delay circuit, a pulse generator supplying pulses to said front and side radars and to said delay circuit, a photo record pick-up containing a map carriage mounting a map film and supplied pulses from said delay circuit, a front radar comparison amplifier to which said photo record pick-up supplies velocity error signal, a map carriage servomotor responsive to velocity error signal from said front radar comparison amplifier in altering the operation rate of the map carriage in said photo record pick-up, a side radar comparison amplifier to which said photo record pick-up supplies azimuth error signal, an azimuth servomotor responsive to azimuth error signal from said side radar comparison amplifier, a first potentiometer having a contact arm wiping a first winding in response to azimuth error from said azimuth servomotor to supply an azimuth correction potential to said delay circuit, and a second potentiometer having a contact arm ganged with the contact arm of said first potentiometer for wiping a second winding and developing an azimuth error potential for maintaining said unattended aircraft on a flight course determined by the map film on the map carriage in said photo record pick-up.

2. A radar map guidance system for navigating an unattended aircraft from a map film of a reconnaissance flight, the unattended aircraft equipment comprising a photo record pick-up having a map carriage in which said map film is mounted for operation and including a cathode ray tube before the screen of which the map film is passed by the map carriage, a map carriage servomotor actuating the map carriage in said photo record pick-up, a front radar carried by said aircraft, a side radar carried by said aircraft, a delay circuit, a pulse generator supplying pulses to said front radar and to said side radar and to said delay circuit, a front radar comparison amplifier in circuit between said front radar and said map carriage servomotor for modifying the rate of operation thereof in response to velocity signal from said photo record pick-up, a photo sweep generator passing pulses from said delay circuit to said photo record pick-up, a side radar comparison amplifier receiving input from said side radar and azimuth input from said photo record pick-up, an azimuth servomotor in circuit with and responsive to signal from said side radar comparison amplifier, a first potentiometer having an arm actuated by said azimuth servomotor and passing a potential to said delay circuit for modifying the pulses supplied therefrom to said photo record pick-up, and an error voltage second potentiometer having an arm ganged with said first potentiometer arm and supplying an error voltage for maintaining in azimuth the flight course of the unattended aircraft.

3. A radar map guide system for causing an unattended aircraft to duplicate a flight path of a reconnaissance aircraft, comprising in the reconnaissance aircraft, a front radar, a side radar, a pulse generator supplying a pulse frequency to both said front and side radars, a photo record pick-up including a cathode ray tube having a screen and a map carriage passing a film across the cathode ray tube screen, a photo sweep generator receiving a pulse input from said pulse generator and supplying a sweep frequency to said photo record pick-up, a map carriage servomotor driving the map carriage in said photo record pick-up, a manually operable ground speed control for modifying the potential supplied to and the speed of said map carriage servomotor, for use in the reconnaissance aircraft in the making of a map to be used in the unattended aircraft for determining the flight path thereof, comparable equipment on said unattended aircraft comprising also a velocity servo loop for controlling the travel of said map carriage in said photo record pick-up when velocity correction signal from said photo record pick-up is developed, a comparison amplifier in the front radar velocity servo loop for maintaining in synchronism a map carriage servomotor in said unattended aircraft, and an azimuth servo loop wherein servo correction signal from said photo record pick-up is passed to a side radar comparison amplifier actuating an azimuth servomotor, a first potentiometer means developing a potential in response to signal from said azimuth servomotor in said azimuth servo loop, a delay circuit to which azimuth correcting potential is supplied from said first potentiometer, a photo sweep generator receiving its input from said delay circuit and supplying a sweep timing voltage to the cathode ray tube in said photo record pickup, and a second potentiometer means driven by said azimuth servomotor and providing an azimuth error signal for controlling in azimuth the flight path of said unattended aircraft.

References Cited in the file of this patent

UNITED STATES PATENTS

| | | |
|---|---|---|
| 2,489,251 | Anast | Nov. 29, 1949 |
| 2,506,127 | Allen | May 2, 1950 |
| 2,526,682 | Mulberger et al. | Oct. 24, 1950 |
| 2,528,202 | Wolff | Oct. 31, 1950 |

FOREIGN PATENTS

| | | |
|---|---|---|
| 856,256 | France | Mar. 18, 1940 |
| 614,595 | Great Britain | Dec. 17, 1948 |